US012236544B2

(12) United States Patent
Shiokawa et al.

(10) Patent No.: US 12,236,544 B2
(45) Date of Patent: Feb. 25, 2025

(54) DISPLAY TERMINAL, DISPLAY CONTROL SYSTEM AND DISPLAY CONTROL METHOD

(71) Applicant: MAXELL, LTD., Kyoto (JP)

(72) Inventors: Junji Shiokawa, Kyoto (JP); Yasunobu Hashimoto, Kyoto (JP); Mitsunobu Watanabe, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/595,254

(22) Filed: Mar. 4, 2024

(65) Prior Publication Data

US 2024/0203073 A1 Jun. 20, 2024

Related U.S. Application Data

(63) Continuation of application No. 18/299,113, filed on Apr. 12, 2023, now Pat. No. 11,972,532, which is a
(Continued)

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/165* (2013.01); *G06T 19/20* (2013.01); *G06V 20/20* (2022.01); *H04N 23/10* (2023.01)

(58) Field of Classification Search
None
See application file for complete search history.

(56) References Cited

U.S. PATENT DOCUMENTS

2015/0062117 A1 3/2015 Reitmayr
2016/0018897 A1 1/2016 Nagai et al.
(Continued)

FOREIGN PATENT DOCUMENTS

JP 2013-196492 A 9/2013
JP 2016-142887 A 8/2016
(Continued)

OTHER PUBLICATIONS

The Notice of Reasons for Refusal issued in corresponding Japanese patent application No. 2022-197561, dated Nov. 21, 2023 w/English Translation.
(Continued)

*Primary Examiner* — Jwalant Amin
(74) *Attorney, Agent, or Firm* — Rimon P.C.

(57) ABSTRACT

A display terminal having a display includes a color image camera and a distance image camera for acquiring a color image and a distance image of a predetermined photographing range, respectively, and a display control unit for displaying a virtual object on the display. The display control unit includes a space recognition unit for using the color image and the distance image to generate a three-dimensional map of a structural object, a display data generation unit for generating display data in which a rear region of the virtual object behind the structural object in a line-of-sight direction is specified, based on the three-dimensional map and real space placement position data of the virtual object, and the display correction unit for correcting the display data to display operation points of the rear region, which accept an operation instruction to the virtual object, and displaying it on the display.

8 Claims, 14 Drawing Sheets

Related U.S. Application Data continuation of application No. 17/413,257, filed as application No. PCT/JP2018/045883 on Dec. 13, 2018, now Pat. No. 11,651,567.

(51) Int. Cl.
- *G06F 3/16* (2006.01)
- *G06T 19/20* (2011.01)
- *G06V 20/20* (2022.01)
- *H04N 23/10* (2023.01)

(56) References Cited

U.S. PATENT DOCUMENTS

| | | |
|---|---|---|
| 2016/0225190 A1 | 8/2016 | Yamazaki |
| 2016/0307374 A1 | 10/2016 | Kurz et al. |
| 2017/0061691 A1 | 3/2017 | Scott et al. |
| 2018/0046245 A1 | 2/2018 | Schwarz et al. |
| 2019/0236849 A1 | 8/2019 | Seshita |
| 2020/0118341 A1 | 4/2020 | Ohashi |
| 2020/0394845 A1 | 12/2020 | Jin et al. |
| 2020/0402310 A1 | 12/2020 | Nidaira et al. |

FOREIGN PATENT DOCUMENTS

| | | |
|---|---|---|
| JP | 2016-534466 A | 11/2016 |
| JP | 2018-132847 A | 8/2018 |
| WO | 2014/141504 A1 | 9/2014 |
| WO | 2018/025511 A1 | 2/2018 |
| WO | 2019-092590 A1 | 5/2019 |

OTHER PUBLICATIONS

Notice of Allowance issued Dec. 7, 2023 in U.S. Appl. No. 18/299,113.
International Search Report issued in corresponding International Patent Application No. PCT/JP2018/045883, dated Feb. 19, 2019, with English translation.
Notice of Allowance issued Jan. 10, 2023 in U.S. Appl. No. 17/413,257.
Office Action issued Sep. 30, 2022 in U.S. Appl. No. 17/413,257.
Non-Final Office Action dated Sep. 12, 2024, from corresponding U.S. Appl. No. 18/659,995, 32 pages.

DISPLAY TERMINAL, DISPLAY CONTROL SYSTEM AND DISPLAY CONTROL METHOD

CROSS REFERENCE

This application is a Continuation of U.S. patent application Ser. No. 18/299,113, filed on Apr. 12, 2023, which is a continuation of U.S. patent application Ser. No. 17/413,257, filed on Jun. 11, 2021, which is the U.S. National Phase under 35 U.S.C. § 371 of International Application No. PCT/JP2018/045883, filed on Dec. 13, 2018, the entire contents of each are hereby incorporated by reference.

TECHNICAL FIELD

The present invention relates to a technique for displaying a virtual object in a display terminal.

BACKGROUND ART

Augmented Reality (AR) images add information by a computer to an object in a real space, and are displayed on a display terminal such as a Head Mounted Display (HMD). There has been a technique for improving the visibility of the AR images, for example, Patent Literature 1 discloses a head-mounted display device equipped with a display section, through which an external world can visually be recognized, "comprising: a superimposition image display control section adapted to make the display section display a predetermined image so as to be superimposed on the external world to visually be recognized in a see-through manner; an imaging section adapted to capture an image of at least a predetermined range out of the external world visually recognized in a see-through manner; a partial image determination section adapted to determine a partial image of a predetermined range, which corresponds in position to the predetermined image, out of the captured image obtained by the imaging section; and a visibility correction section adapted to correct visibility of the predetermined image displayed by the superimposition image display control section in accordance with color information related to the partial image determined" (excerpted from Abstract).

CITATION LIST

Patent Literature

Patent Literature 1: JP-A-2016-142887

SUMMARY OF INVENTION

Technical Problem

A user may move, rotate, and transform a virtual object to be displayed in an AR image by providing instructions to operation points set in advance around the virtual object. Nevertheless, depending on a display position of the virtual object, a part of the virtual object may be placed behind the structural object, and accordingly, there may be a case where the operation points necessary for operating the virtual object are not displayed due to hidden surface removal. In the case above, it is not possible to necessarily obtain a high operability. On the other hand, when the virtual object is displayed as it is regardless of the placement position of the virtual object after the operation, the user cannot feel a sense of reality.

The present invention has been made in view of the circumstance above, and an object thereof is to provide a virtual object display technique which realizes a high operability while maintaining a sense of reality regardless of a display position of a virtual object.

Solution to Problem

In the present invention, provided is a display terminal including a display, the display terminal including: a color image camera configured to acquire a color image of a predetermined photographing range; a distance image camera configured to acquire a distance image of the photographing range; and a display control unit configured to display a virtual object on the display, the display control unit including: a space recognition unit configured to use the color image and the distance image to generate a three-dimensional map of a structural object existing within the photographing range; a display data generation unit configured to generate display data in which a region of the virtual object behind the structural object in a line-of-sight direction is specified as a rear region, based on the three-dimensional map and real space placement position data of the virtual object to be displayed; and a display correction unit configured to correct the display data and display the display data as corrected on the display, the display correction unit being configured to correct the display data so as to display operation points of the rear region, and the operation points being points that accept an operation instruction with respect to the virtual object via the operation points.

Advantageous Effects of Invention

According to the present invention, it is possible to provide a virtual object display technique which realizes a high operability while maintaining a sense of reality regardless of a display position of a virtual object. The issues, configurations, and effects other than those described above will be clarified by explanation of the embodiment below.

DESCRIPTION OF EMBODIMENTS

Hereinafter, an embodiment of the present invention will be described with reference to the drawings. In the following, elements having the same functions thereamong are provided with the same reference signs unless otherwise noted, and repetitive explanation therefor will be omitted. The present invention is not limited to the present embodiment which will be described below.

In the present embodiment, as a display terminal, an example of a Head Mounted Display (HMD) which is to be worn on the head of a user (wearer) will be described. The HMD according to the present invention is a transmission type (see-through type) HMD equipped with a transmission type display, which enables the user to visually recognize both the outside world and display images.

Figure 1A:
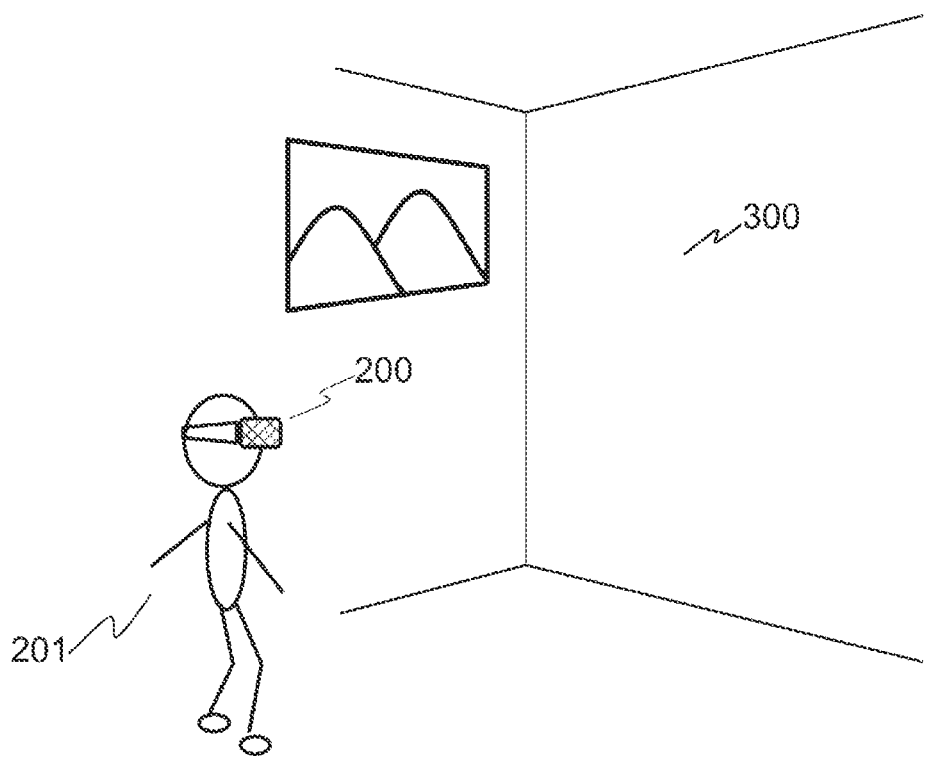
FIG. 1A to FIG. 1C explain an outline of virtual object display processing according to an embodiment of the present invention.
Figure 1B:
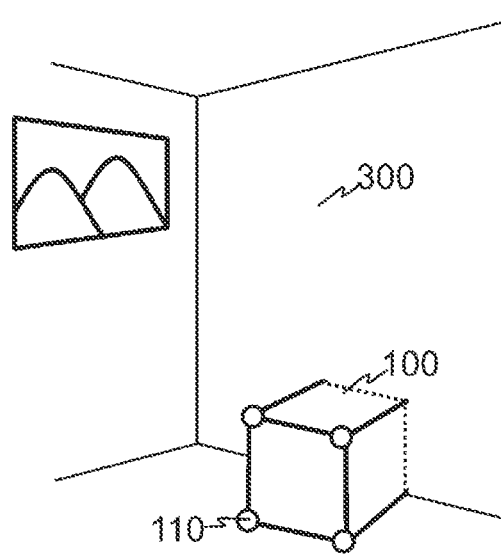

Firstly, an outline of the present embodiment will be described with reference to FIG. 1A to FIG. 1C. In the present embodiment, as illustrated in FIG. 1A, a user 201 wears an HMD 200 in a room and operates the HMD 200 by making a virtual object 100 displayed on a display of the HMD 200.

The HMD 200 has distance information (depth information) of the real space and the virtual object 100. Conventionally, as illustrated in FIG. 1B, the display of the HMD 200 does not display a portion of the virtual object 100 located behind (deeper than) a structural object 300 such as a wall in the real space. Accordingly, in the case above, the user 201 cannot recognize the whole of the virtual object 100.

Furthermore, generally, the user 201 moves, rotates, and transforms the virtual object 100 by operating operation points (transform controller) 110 set on or near the virtual object 100. When the virtual object 100 is displayed as illustrated in FIG. 1B, the user 201 cannot operate the virtual object 100 since the operation points 110 of the portion of the virtual object 100 behind the structural object 300 are not displayed.

Figure 1C:
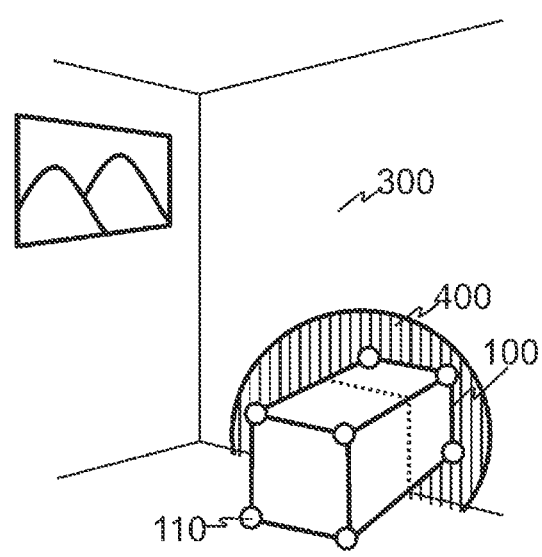

In the present embodiment, in order to solve the problem above, as illustrated in FIG. 1C, all the operation points 110 of the virtual object 100 are displayed even when the structural object 300 exists. In addition, the whole of the virtual object 100 itself may be displayed as well. At this time, an additional object 400 may be displayed so as to let the user 201 recognize that a portion which is not originally displayed is being displayed.

Hereinafter, the HMD 200 according to the present embodiment for realizing the display control as described above will be explained.

[Hardware Configuration]

Figure 2A:
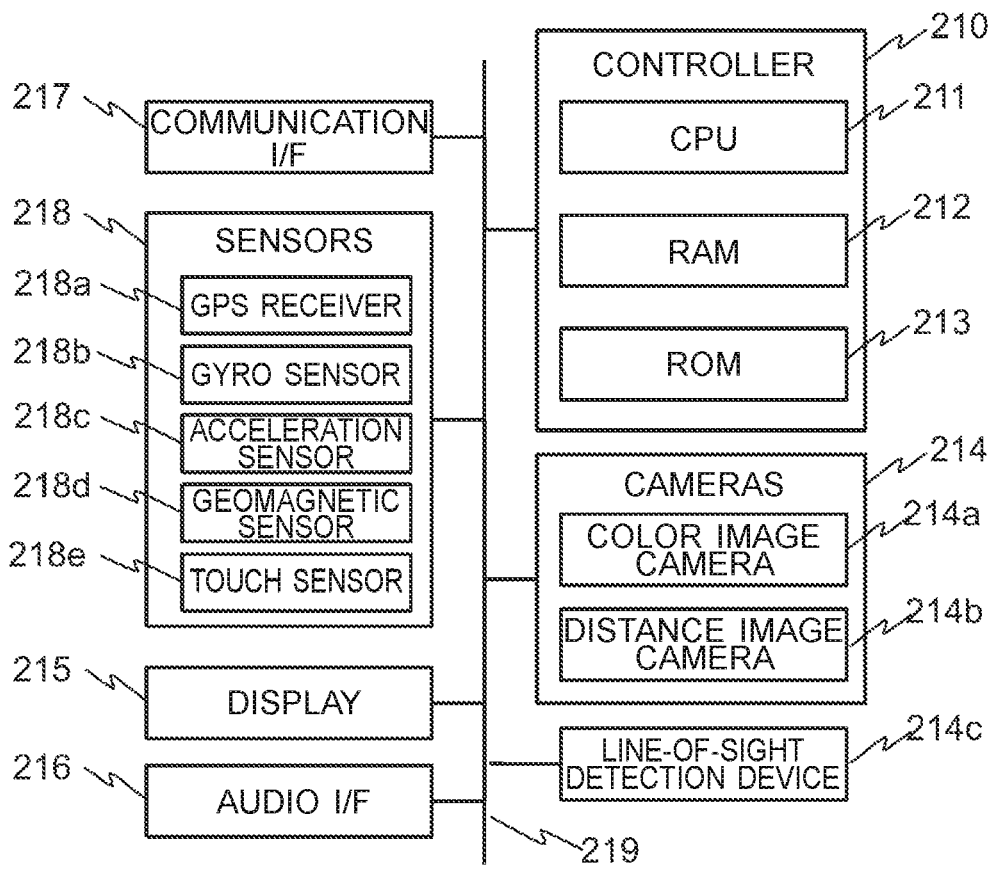
FIG. 2A illustrates a hardware configuration of an HMD according to the embodiment of the present invention.
Figure 2B:
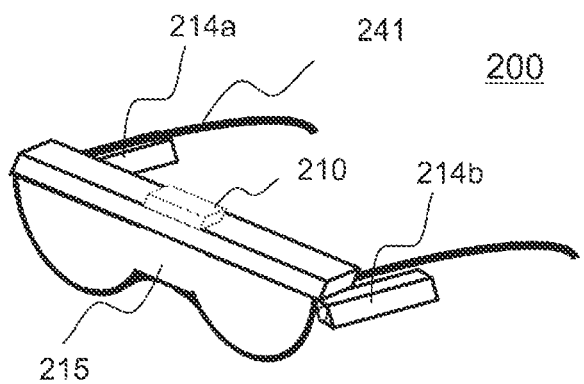
FIG. 2B illustrates an appearance of the HMD according to the embodiment of the present invention.

FIG. 2A illustrates a hardware configuration of the HMD 200. FIG. 2B illustrates an appearance of the HMD 200 according to the present embodiment.

The HMD 200 according to the present embodiment basically has the same configuration as that of a general-purpose computer (information processing device). That is, as illustrated in FIG. 2A, the HMD 200 includes a controller 210, cameras 214, a display 215, an audio interface (I/F) 216, a communication I/F 217, sensors 218, a bus 219 for electrically connecting each part, and a line-of-sight detection device 214c. In addition, the HMD 200 according to the present embodiment includes a frame 241 for supporting each part of the HMD 200 and allowing the user 201 to wear the HMD 200.

The controller 210 is configured to perform various kinds of processing in accordance with predetermined programs. In the present embodiment, for example, the controller 210 displays the virtual object 100 at a predetermined position on the display 215.

The controller 210 of the present embodiment includes a CPU 211, a RAM 212, and a ROM 213. The CPU 211 loads programs stored in advance in the ROM 213 onto the RAM 212 and executes them to implement various functions. In this connection, both the RAM 212 and the ROM 213 are collectively referred to as a storage device 230 (see FIG. 3) in the case of not requiring distinguishment between them. The controller 210 is disposed, for example, on the frame 241.

The cameras 214 include a color image camera 214a and a distance image camera 214b. The color image camera 214a is configured to capture images of a photographing range including a visual field range of the user 201 to acquire a color image. The distance image camera 214b is configured to acquire a distance image of a photographing range which is substantially the same as the photographing range of the color image camera 214a. The cameras 214 (color image camera 214a and distance image camera 214b) are disposed, for example, at positions on the foremost portions of the frame 241 (closest to the display 215) which enable the cameras 214 to capture images of the above-mentioned photographing range.

The display 215 displays images acquired by the cameras 214 and display data generated in the HMD 200. The display 215 is constituted by, for example, a transmission type liquid crystal device, an organic EL device, or an optical scanning device using a Micro Electro Mechanical Systems (MEMS). Meanwhile, the device for constituting the display 215 is not limited thereto, and any device may be used as long as it can realize a transmission type display structure which allows the other side of the display 215 to be seen through while allowing an image to be displayed on the display 215.

In the case of the HMD 200 according to the present embodiment, the transmission type display 215 is supported in front of one or both eyes of the user 201. The display 215 can be any shape. The display 215 may be provided with right and left display panels, and may display one or more UI objects of a graphical user I/F.

The audio I/F 216 is, for example, an audio output device such as a microphone, a speaker, and a buzzer. The audio I/F 216 is configured to input an external sound and output a sound such as a sound created in the HMD 200 and a sound or music transmitted through the communication I/F 217. Meanwhile, in the present embodiment, the audio I/F 216 may not be provided.

The communication I/F 217 includes such as a coding circuit, a decoding circuit, and an antenna to transmit and receive data to and from other devices through a network (data communication). In the present embodiment, the communication I/F 217 is an I/F for connecting the HMD 200 to the network via an access point (not illustrated) or via a base station of a mobile telephone communication network (not illustrated). The HMD 200 transmits and receives data to and from each server connected to the network via the communication I/F 217.

The connection between the HMD 200 and the access point is performed by, for example, a wireless communication system such as Wi-Fi (registered trademark) or by other communication systems. The connection between the HMD 200 and the base station of the mobile telephone network is performed by, for example, a Wideband Code Division Multiple Access (W-CDMA, registered trademark) method, a Global System for Mobile communications (GSM) method, a Long Term Evolution (LTE) method, or other communication methods. Meanwhile, in the present embodiment, the HMD 200 may not be provided with the communication I/F 217.

The sensors 218 are configured to detect such as a current position, inclination, velocity, and an operation by the user 201 of the HMD 200. The HMD 200 includes, for example, a positional information acquisition sensor such as a GPS receiver 218a, a gyro sensor 218b, an acceleration sensor 218c, a geomagnetic sensor 218d, and a touch sensor 218e, as the sensors 218. Meanwhile, the sensors 218 may not necessarily be provided with all the sensors above.

The line-of-sight detection device 214c is configured to detect a line-of-sight direction of the user 201. The line-of-sight detection device 214c is implemented by, for example, a line-of-sight detection camera for detecting the line-of-sight direction of the user 201. The line-of-sight detection camera is attached so as to include such as an iris and a pupil of the eye of the user 201 in its photographing range.

The frame 241 supports components of the HMD 200 such as the display 215, the cameras 214, and the controller 210.

[Functional Block]

Figure 3:
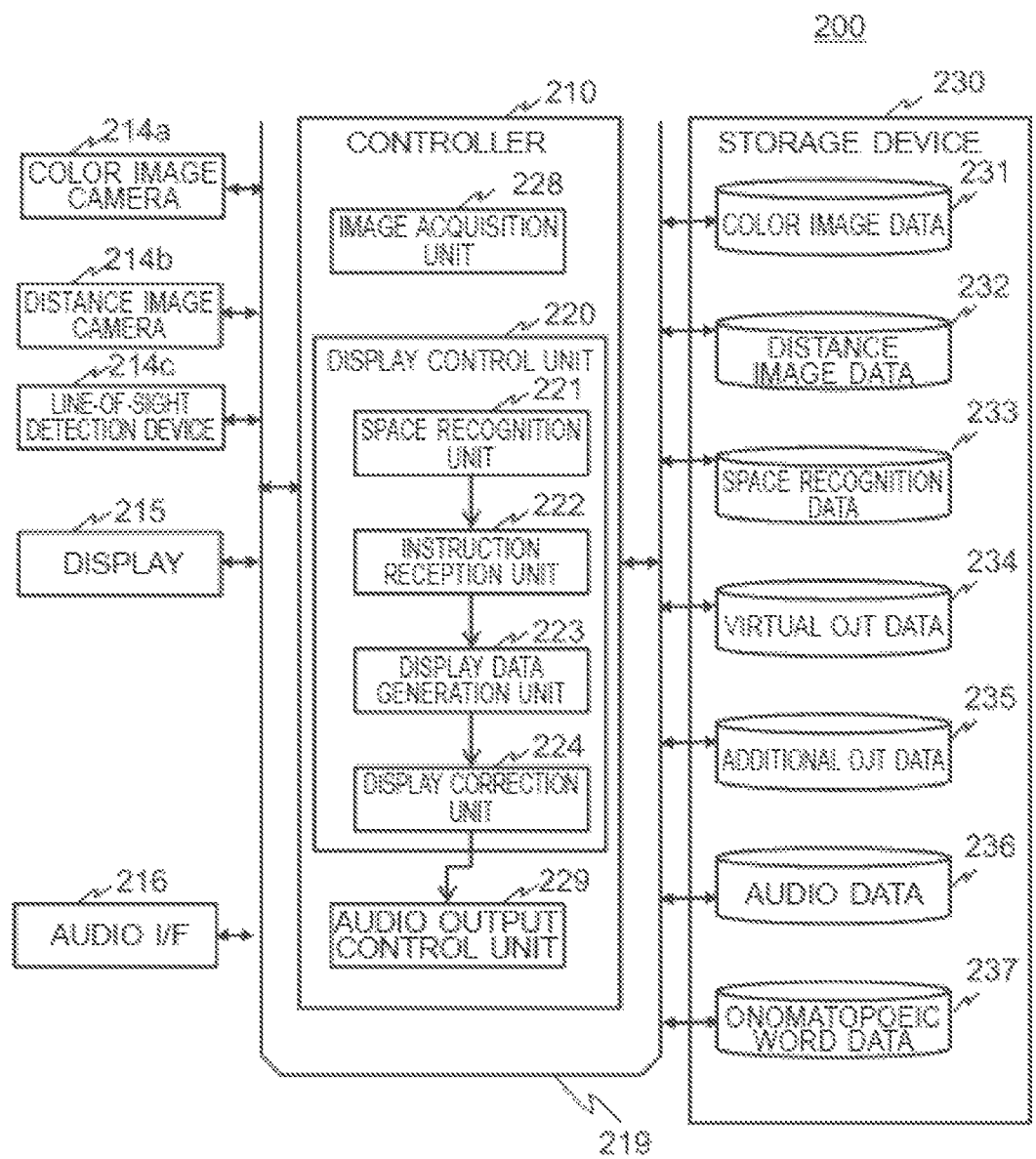
FIG. 3 is a functional block diagram a controller according to the embodiment of the present invention.

Next, the functions related to virtual object display processing, which are implemented by the controller 210 of the present embodiment will be described. FIG. 3 is a functional block diagram illustrating the functions related to the virtual object display processing in the HMD 200 according to the present embodiment. As illustrated in FIG. 3, the controller 210 of the present embodiment implements the functions of an image acquisition unit 228, a display control unit 220, and an audio output control unit 229. The display control unit 220 is provided with a space recognition unit 221, an instruction reception unit 222, a display data generation unit 223, and a display correction unit 224.

The CPU 211 loads the programs stored in the ROM 213 onto the RAM 212 and executes them so that each of the functions are implemented.

The storage device 230 is configured to store color image data 231, distance image data 232, space recognition data 233, virtual object data (virtual OJT data) 234, additional object data (additional OJT data) 235, and audio data 236.

The color image data 231 is an image acquired by the color image camera 214a. The distance image data 232 is an image acquired by the distance image camera 214b.

The image acquisition unit 228 is configured to cause the storage device 230 to store, as the color image data 231 and the distance image data 232, the color image and the distance image acquired by the color image camera 214a and the distance image camera 214b, respectively. In the present embodiment, the color image and the distance image are acquired substantially synchronously with each other.

The space recognition unit 221 is configured to recognize the surrounding real space and cause the storage device 230 to store the result of the recognition above as the space recognition data 233. The space recognition unit 221 recognizes the surrounding real space based on the color image data 231 and the distance image data 232 acquired substantially simultaneously.

In accordance with a scanning operation performed by the user 201, the space recognition unit 221 generates the space recognition data 233, which is three-dimensional data (three-dimensional map) of the structural object 300 existing in the photographing range, based on each image data at predetermined time intervals and causes the storage device 230 to store the generated space recognition data 233. The scanning of the surroundings is performed by the user 201, for example, immediately after startup as an initial setting.

The space recognition data 233 is generated, for example, in a world coordinate system that defines the whole three-dimensional space. For example, as the origin and each axis direction of the world coordinate system, the origin and each axis direction in a local coordinate system of the HMD 200, which are specified based on the position and orientation (initial posture) of a main body of the HMD 200 at the time of receiving an instruction for starting space recognition, are used. In this coordinate system, for example, regarding the initial posture of the main body of the HMD 200, when a predetermined position on the display 215 of the HMD 200 is set as the origin and the plane of the display 215 is set as the xy-plane, the z-axis direction is perpendicular to the xy-plane (plane of the display 215).

In this connection, an amount of displacement and an amount of rotation of the HMD 200 in the local coordinate system in response to the scanning operation by the user 201 with respect to the world coordinate system are calculated based on data obtained by the various sensors 218.

The space recognition is performed, for example, by using the technique such as the conventional Spatial Mapping. Specifically, the HMD 200 according to the present embodiment scans the surroundings by means of the color image camera 214a and the distance image camera 214b. Then, based on the result of the space recognition, the space recognition unit 221 uses an application software such as the Spatial Mapping to generate three-dimensional data. The space recognition data 233 is held as, for example, mesh data.

At this time, Spatial Understanding for recognizing, not only the three-dimensional data, but also the type of the structural object 300 may be performed simultaneously. The space recognition unit 221 can recognize the material and type of the structural object existing within the photographing range by the Spatial Understanding. That is, the space recognition unit 221 can recognize whether the structural object 300 is, for example, a wall, a floor, or a ceiling. The space recognition unit 221 of the present embodiment causes the storage device 230 to store the recognition results as attribute data of the space recognition data 233.

The instruction reception unit 222 is configured to accept, from the user 201, a display instruction and an operation instruction with respect to the virtual object 100 to be displayed on the display 215. The display instruction and the operation instruction include, for example, instructions by a line-of-sight (gaze) and movement (gesture) of a finger.

The information of the line-of-sight direction used for the gaze is detected by, for example, the line-of-sight detection device 214c.

The gesture includes, for example, click-event (air tap), tap-and-hold, and bloom on the operation points 110 of the virtual object 100. The instruction reception unit 222 detects movement of a finger in a gesture frame provided within the photographing range of the color image camera 214a and the distance image camera 214b to detect such as the display instruction and the operation instruction.

For example, upon accepting the display instruction, the instruction reception unit 222 extracts, from the virtual object data 234, the data of the virtual object 100 that is subject to the instruction, and causes the display data generation unit 223 which will be described later to generate the display data.

Upon accepting the operation instruction, the instruction reception unit 222 detects the operation and notifies it to the display data generation unit 223, which will be described later.

In accordance with the instruction from the user 201 through the instruction reception unit 222, the display data generation unit 223 generates, based on the virtual object data 234, the display data for displaying the virtual object 100 that is subject to the instruction at a predetermined position on the display 215 in a predetermined shape. The display data generated in accordance with the instruction from the instruction reception unit 222 is displayed on the display 215, whereby the virtual object 100 is displayed so as to be moved, rotated, and transformed in accordance with the instruction of the user 201.

At this time, the display data generation unit 223 generates the display data in which, in the line-of-sight direction of the user 201 (calculated based on the real space coordinate position of the HMD 200 worn by the user 201 and the information of the vertical and horizontal orientations thereof), a region of the virtual object 100 behind the structural object 300 is specified as a rear region 101. The rear region 101 (FIG. 4) is specified based on the three-dimensional map (space recognition data 233) generated by the space recognition unit 221 and the placement position data of the virtual object 100 in the real space. The placement position data in the real space is stored in the same coordinate system as that used for the space recognition performed by the space recognition unit 221.

The placement position data of the virtual object 100 in the real space is acquired from the virtual object data 234 of the virtual object 100 to be displayed. The virtual object data 234 includes the size, shape, and initial placement position information for each virtual object 100. As the initial placement position information, for example, a placement position point and the operation points 110 which have been set in advance for each virtual object 100 are stored. The placement position point is, for example, a three-dimensional position of the center of gravity of the virtual object 100. As described above, the operation points 110 are the points that accept an instruction for transforming the display shape of the virtual object 100.

The display data generation unit 223 reflects the instruction from the instruction reception unit 222 to the current placement position information to acquire the latest placement position information of the virtual object data 234 corresponding to the virtual object 100 to be displayed. Then, the display data generation unit 223 uses the latest placement position information of the placement position point and the information such as the size and shape to acquire the placement position data of the virtual object 100 in the real space.

The display data generation unit 223 uses the latest placement position data in the real space to further identify the rear region 101 of the virtual object 100 to be displayed. For example, based on the placement position data of the virtual object 100 in the real space, the display data generation unit 223 specifies the depth information of the virtual object 100. The depth information is specified based on the distance to the virtual object 100, which is calculated based on the real space coordinate position of the HMD 200 worn by the user 201 and the vertical and horizontal orientations, the shape data of the virtual object 100, and the coordinate position of the structural object 300.

In the depth information, the region (portion) of the virtual object 100 and the operation points 110 which are positioned relatively deeper than the depth information of the structural object 300 are defined as the rear region 101.

Figure 4A:
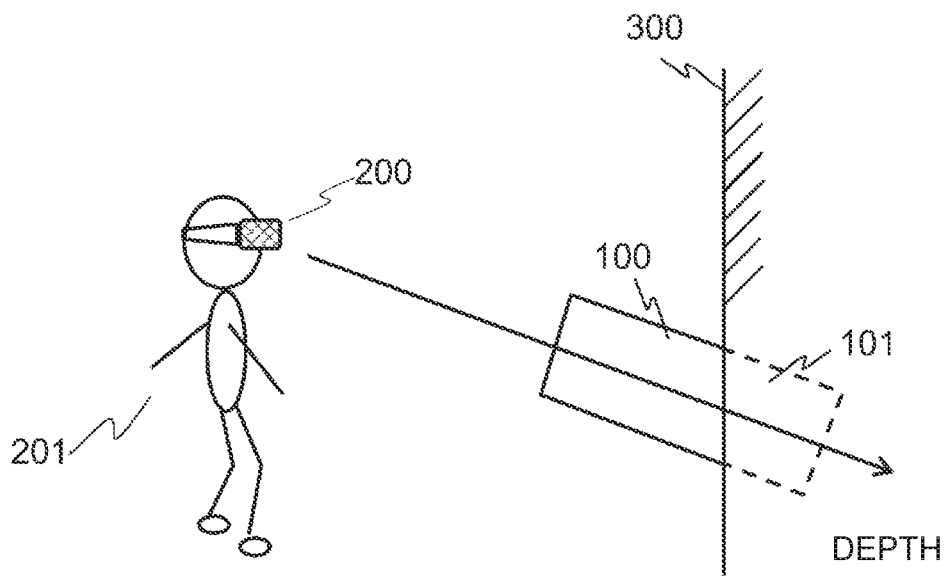
FIG. 4A and FIG. 4B explain an outline of the virtual object display processing according to the embodiment of the present invention.

Generally, the rear region 101 is subject to hidden surface removal processing. For example, as illustrated in FIG. 4A, when a portion of the virtual object 100 is placed deeper than the structural object 300 such as a wall or furniture, conventionally, the display data generation unit 223 implements the hidden surface removal processing on the rear region 101 of the virtual object 100 to generate the display data for hiding the rear region 101.

Figure 4B:
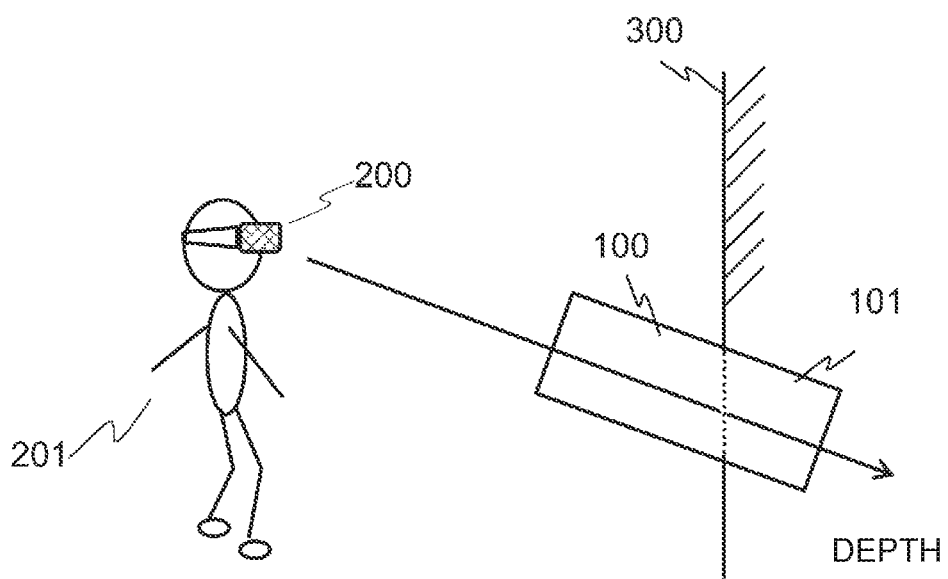

On the other hand, since the present embodiment aims to achieve more a user-friendly display mode, even in the case above, the display correction unit 224 implements the processing for correcting a display data so as to display the whole of the virtual object 100 and the associated operation points 110 as illustrated in FIG. 4B.

The display correction unit 224 is configured to correct the display data of the virtual object data 234 in the case where the virtual object data 234 to be displayed includes the rear region 101.

Specifically, the display correction unit 224 cancels the hidden surface removal processing on the rear region 101. Then, the display correction unit 224 corrects the display data so as to display the rear region 101 as if the structural object 300 does not exist. That is, the display correction unit 224 corrects the display data so that the rear region 101 is displayed even if a partial region of the virtual object data 234 is placed deeper than the structural object 300.

Furthermore, at this time, the display correction unit 224 displays the additional object 400 to let the user know that the virtual object 100 is not being displayed in an original display mode. The additional object 400 is an object for making the virtual object 100 appear more naturally with reality, for example, by displaying the virtual object 100 as if it penetrated the structural object 300 or a hole was formed in the structural object 300.

The data of the additional object 400 to be displayed is prepared in advance as the additional object data 235 in the storage device 230. The additional object data 235 is stored in association with the information such as a display mode of the additional object 400, initial size, and initial display position with respect to a display position of the virtual object 100.

When the display direction of the virtual object 100 with respect to the line-of-sight direction of the user 201 is changed in accordance with the operation performed by the user 201, the display correction unit 224 may transform the display shape of the additional object 400 in response to the change in the line-of-sight direction. Furthermore, when the display direction of the virtual object 100 is changed in accordance with the movement of the line-of-sight direction of the user 201, the display correction unit 224 may also transform the display shape of the additional object 400 in the same manner as above. The display correction unit 224 transforms the additional object 400 in accordance with, for example, the same program as that used for transforming the display of the virtual object 100 in response to the change in the line-of-sight direction.

Figure 5:
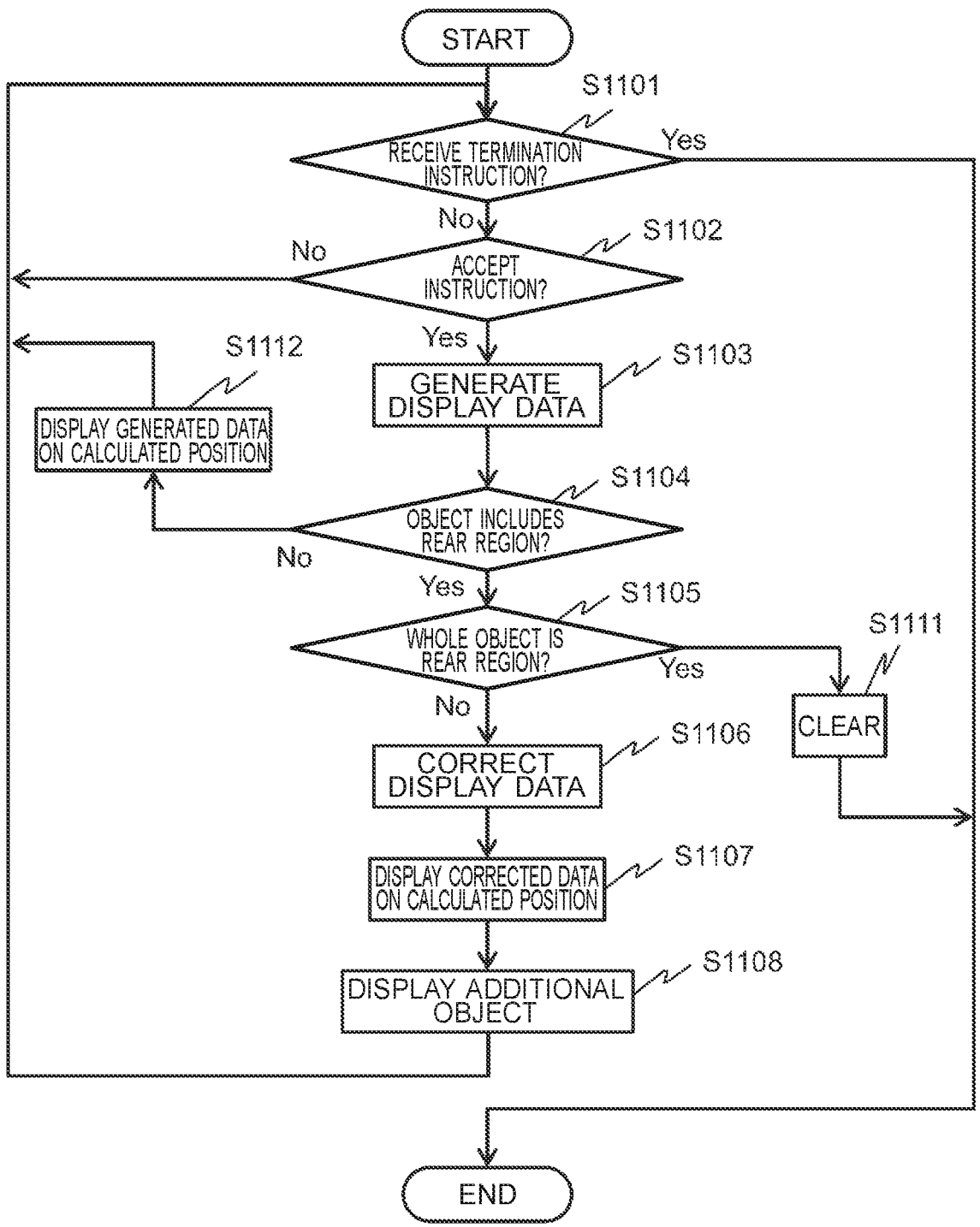
FIG. 5 illustrates a flow chart of the virtual object display processing according to the embodiment of the present invention.

Next, a flow of display processing of the virtual object 100 to be performed by the controller 210 of the present embodiment will be described. FIG. 5 illustrates a flow of the virtual object display processing of the present embodiment. In the following, it is assumed that the space recognition processing has already been performed as the initial processing. Furthermore, it is assumed that the virtual object 100 is displayed at a position allowing the whole object to be displayed.

The display data generation unit 223 and the display correction unit 224 repeat the following processing until receiving a termination instruction from the user 201 via the instruction reception unit 222 (step S1101).

Upon accepting an operation for moving the virtual object 100 from the user 201 via the instruction reception unit 222 (step S1102), the display data generation unit 223 generates display data (step S1103).

In step S1103, firstly, the display data generation unit 223 calculates a display position of the virtual object 100 on the display 215. Next, the display data generation unit 223 specifies a line-of-sight direction, and calculates depth information in accordance with the virtual object data 234 corresponding to the virtual object 100. In addition, the display data generation unit 223 also calculates depth information of the structural object 300. Then, the display data generation unit 223 specifies the rear region 101 in the display data.

Next, the display data generation unit 223 determines whether the virtual object 100 to be displayed includes the rear region 101 (step S1104).

In the case of absence of the rear region 101 (step S1104; No), the display data generation unit 223 notifies the display correction unit 224 thereof. The display correction unit 224 displays the display data of the virtual object 100 at the position on the display 215 which has been calculated in step S1103 without any correction (step S1112). Then, the controller 210 waits for the next operation instruction.

In the case of presence of the rear region 101 (step S1104; YES), the display data generation unit 223 determines whether the whole of the virtual object 100 is the rear region 101 (step S1105).

When the whole of the virtual object 100 is the rear region 101 (step S1105; YES), the display data generation unit 223 notifies the display correction unit 224 thereof. Then, the display correction unit 224 clears the display of the virtual object 100 (step S1111), and terminates the processing.

On the other hand, when the whole of the virtual object 100 is not the rear region 101 (step S1105; No), in other words, when the rear region 101 exists in a portion of the virtual object 100, the display data generation unit 223 notifies the display correction unit 224 thereof. The display correction unit 224 corrects the display data of the virtual object 100 by the above-described method (step S1106). Here, the display correction unit 224 corrects the display data so as to display all the operation points 110 of the virtual object 100 and the portion of the virtual object 100 which is subject of an operation by the operation points 110. Then, the display correction unit 224 displays the corrected display data at the position on the display 215 which has been calculated in step S1103 (step S1107).

Thereafter, the display correction unit 224 acquires the additional object data 235 from the storage device 230, and superimposes the additional object data 235 on the rear region 101 of the virtual object 100 to display the superimposed data (step S1108). Then, the controller 210 waits for the next operation instruction.

Figure 6A:
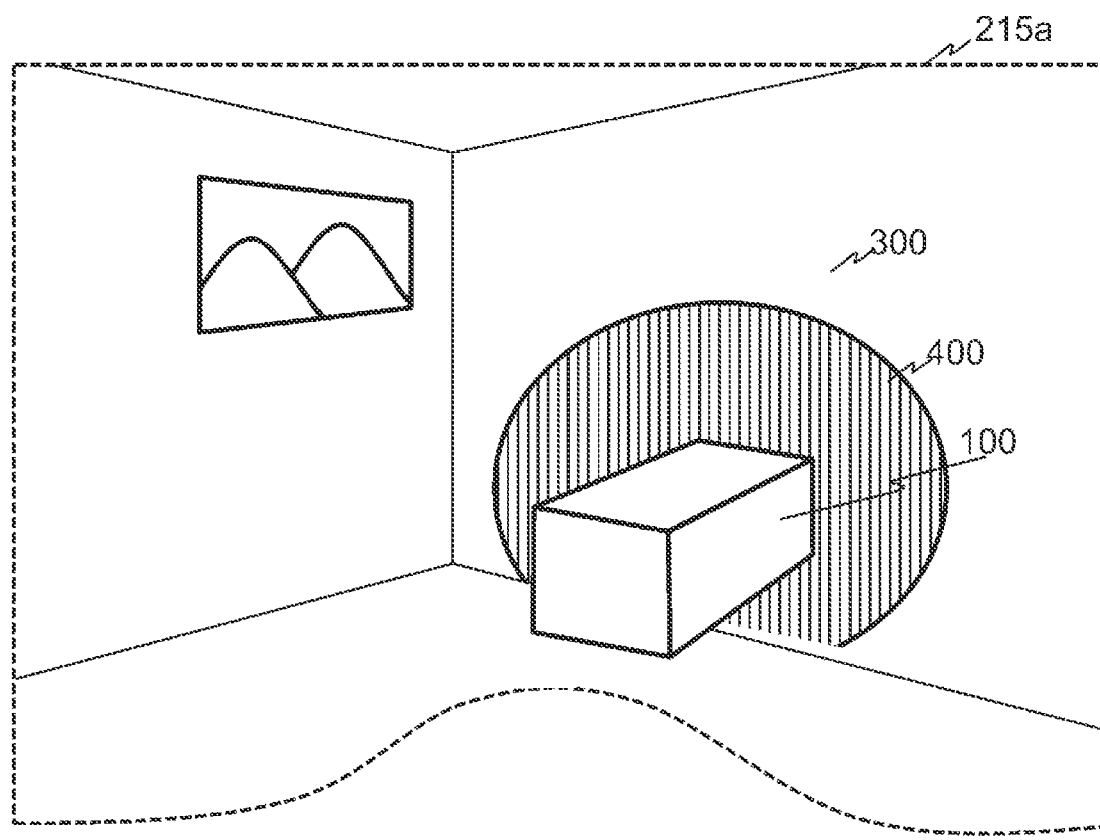
FIG. 6A and FIG. 6B explain the display according to the embodiment of the present invention.
Figure 6B:
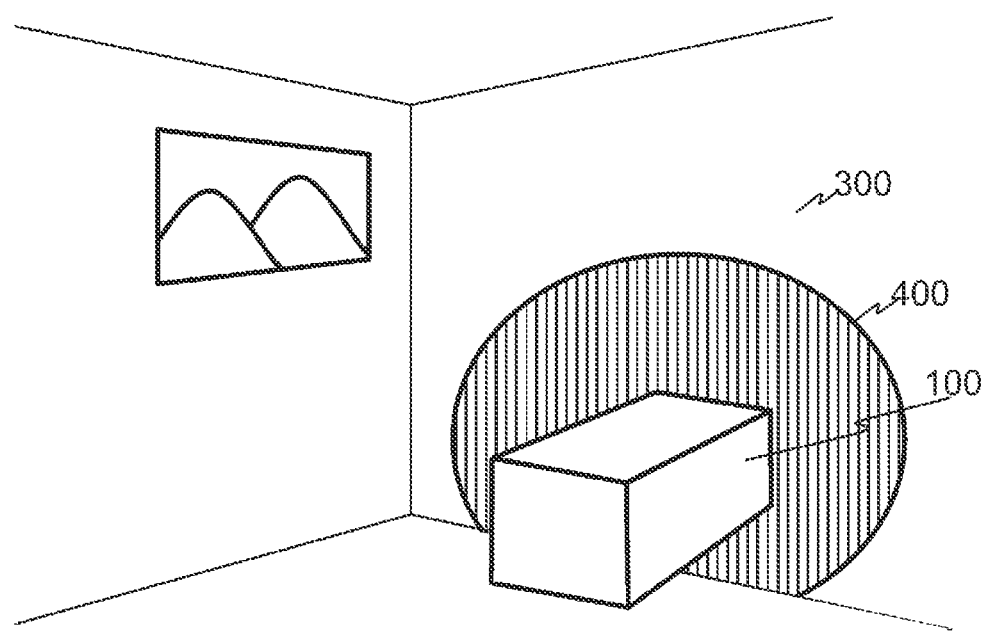

Hereinafter, the processing described above will be explained by using a specific example. As illustrated in FIG. 6A, a frame 215a defined by the display 215 displays the virtual object 100 and the additional object 400. Here, the structural object 300 is a real object in the real space. In the following, a display mode will be described while omitting the frame of the display 215 from the drawings. As illustrated in FIG. 6B, the subsequent drawings illustrate only the real object which is visible through the display 215 and the display data of the virtual object 100.

Figure 7A:
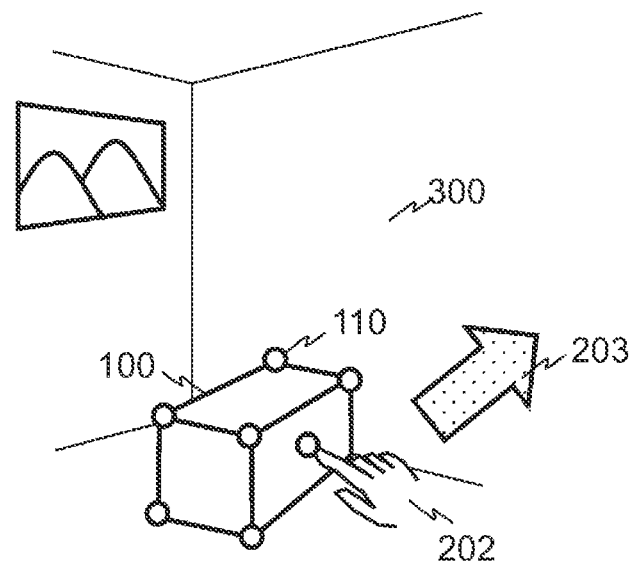
FIG. 7A to FIG. 7C explain an example of a virtual object display mode according to the embodiment of the present invention.

For example, it is assumed that the virtual object 100 is displayed at a position illustrated in FIG. 7A. When the user 201 provides, in the real space, an operation instruction (gesture) to push the virtual object 100 in the direction of the arrow 203 with the finger 202 and repeats this operation, the display position of the virtual object 100 relative to the structural object 300 that is the real object in the real space is made to move.

Figure 7B:
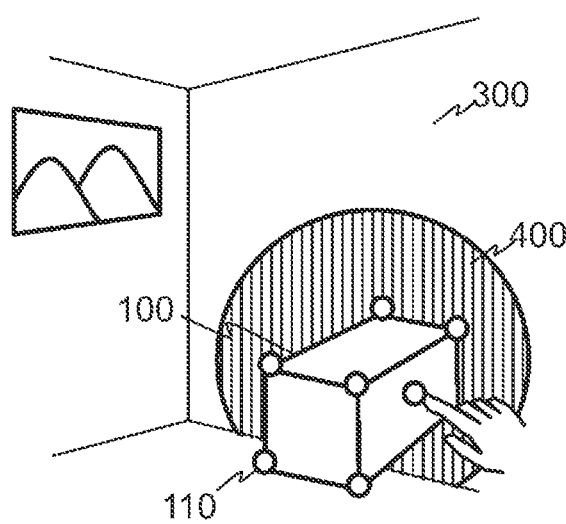

According to the present embodiment, as illustrated in FIG. 7B, even when the display position of a portion of the virtual object 100 is located deeper than the structural object 300, the virtual object 100 is displayed as a whole, together with its operation points 110. Furthermore, at this time, the additional object 400 is displayed to show as if a hole was formed in the wall that is the structural object 300.

Figure 7C:
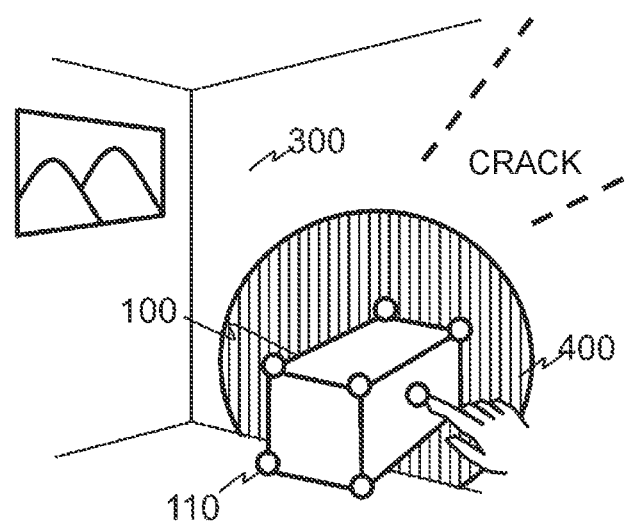

Furthermore, at this time, as illustrated in FIG. 7C, the audio output control unit 229 may be configured to perform audio output. When displaying the additional object 400, the display correction unit 224 notifies the audio output control unit 229 thereof. Upon receiving the notification from the display correction unit 224, the audio output control unit 229 extracts a sound from the audio data 236 to output the sound via the audio I/F 216.

As the audio data 236, various pieces of data may be stored in association with the materials of the structural object 300. The materials of the structural body 300 are recognized by, for example, Spatial Understanding implemented by the space recognition unit 221 described above.

In addition, at this time, an onomatopoeic word representing the voice data 236 to be output by a string, for example, "crack" as illustrated in FIG. 7C, may be displayed. In this case, onomatopoeic word data 237 for representing the audio data 236 by strings is associated with the voice data 236 and stored in advance in the storage device 230. The display correction unit 224 generates the display data so as to display, near the additional object 400, the onomatopoeia word data 237 which has been stored in association with the sound data 236 to be output.

In this connection, a balloon may be further displayed and the onomatopoeic word data 237 may be displayed in the balloon. In addition, only the onomatopoeia word data 237 may be displayed without outputting the sound data 236.

Figure 8A:
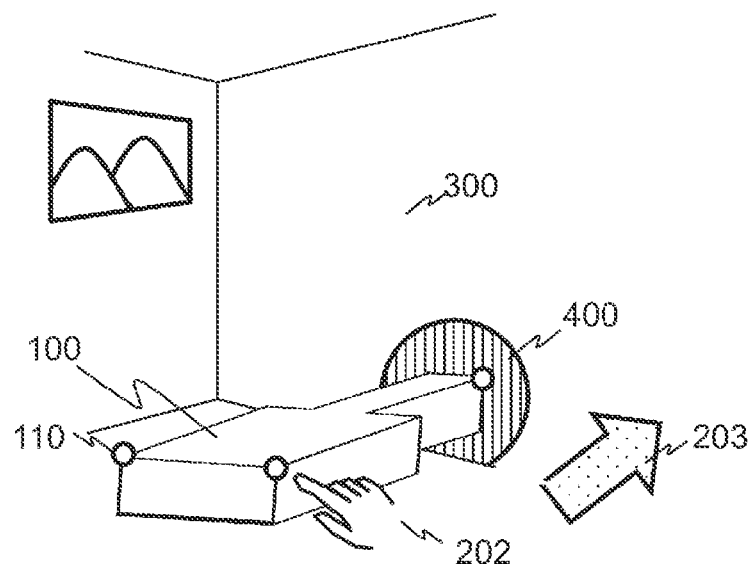
FIG. 8A to FIG. 8C explain another example of the virtual object display mode according to the embodiment of the present invention.

As the virtual object 100 sinks into the structural object 300 deeply, the display correction unit 224 further transforms the shape of the additional object 400 in response thereto. For example, as illustrated in FIG. 8A, a case where the virtual object 100 has the shape combining two rectangular parallelepipeds with different widths therebetween in the horizontal direction will be described as an example.

Here, it is assumed that the virtual object 100 is to be pushed into the structural object 300 from the side of the rectangular parallelepiped having a small width in the horizontal direction in the direction of an arrow 203.

Figure 8B:
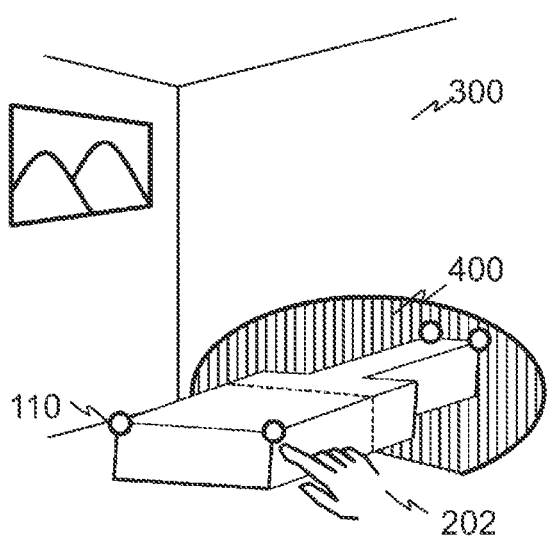

In this case, as illustrated in FIG. 8B, the display correction unit 224 processes the size of the additional object 400 in accordance with the width of the virtual object 100 in the horizontal direction and display the processed additional object 400. Specifically, as illustrated in FIG. 8A, when a region of the rectangular parallelepiped having the small width in the horizontal direction virtually sinks through the structural object 300, the display correction unit 224 displays the additional object 400 in the small size. On the other hand, when a region having the width in the horizontal direction larger than that in the case of FIG. 8A virtually sinks through the structural object 300, the display correction unit 224 displays the additional object 400 in the size larger than that shown in FIG. 8A as illustrated in FIG. 8B.

Figure 8C:
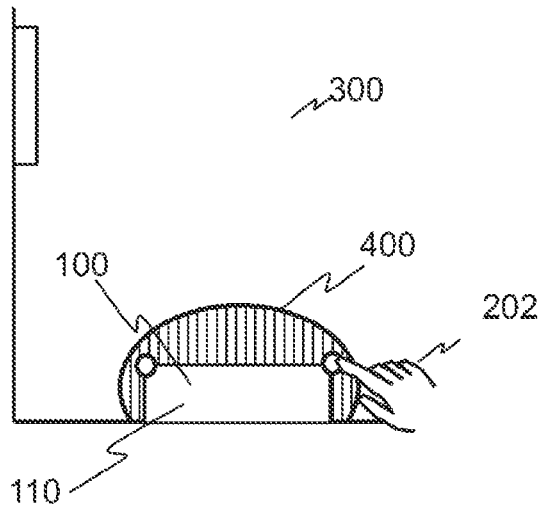

Furthermore, the line-of-sight direction changes due to change in standing positions of the user 201. For example, as illustrated in FIG. 8C, when the user 201 faces the wall that is the structural object 300, even if the display position of the virtual object 100 in the world coordinate system does not change, the display mode of the virtual object 100 varies between the case of FIG. 8C and the cases of FIG. 8A and FIG. 8B. Accordingly, the display shape of the virtual object 100 also changes.

In this case, as illustrated in FIG. 8C, the display correction unit 224 may also transform and display the shape of the additional object 400 in response to the change in the display shape of the virtual object 100.

As described above, the HMD 200 according to the present embodiment comprises: the color image camera 214a configured to acquire a color image of a predetermined photographing range; the distance image camera 214b configured to acquire a distance image of the photographing range; the display 215; and the display control unit 220 configured to display the virtual object 100 on the display 215. The display control unit 220 includes: the space recognition unit 221 configured to use the color image and the distance image to generate a three-dimensional map of the structural object 300 existing within the photographing range; the display data generation unit 223 configured to generate display data in which a region of the virtual object 100 behind the structural object 300 in a line-of-sight direction is specified as the rear region 101, based on the three-dimensional map and real space placement position data of the virtual object 100 to be displayed; and the display correction unit 224 configured to correct the display data and display the corrected display data on the display 215. The display correction unit 224 is configured to correct the display data so as to display the operation points 110 of the rear region 101. The operation points 110 are points that accept an operation instruction with respect to the virtual object 100 via the operation points 110.

As described above, the present embodiment is configured to display the operation points 110 of the rear region 101 of the virtual object 100 behind the structural object 300, which is supposed not to be displayed in a natural state. With this configuration, even when the virtual object 100 is moved in accordance with the operation performed by the user 201, the user 201 can operate the virtual object 100 after the movement.

Furthermore, in the present embodiment, when displaying the operation points 110 of the rear region 101, the display correction unit 224 also displays the rear region 101 as well as the additional object 400 around the virtual object 100.

With this configuration, regardless of the display position of the virtual object 100 on the display 215, it is possible to realize a high operability without depriving the user of a natural visibility, while maintaining a sense of reality.

First Modification

The display mode of the virtual object 100 in which the rear region 101 is partially provided is not limited to the embodiment above. For example, the display correction unit 224 may display the virtual object 100 so as to distinguish the rear region 101 from another region 102 (hereinafter, referred to as a front region).

Figure 9A:
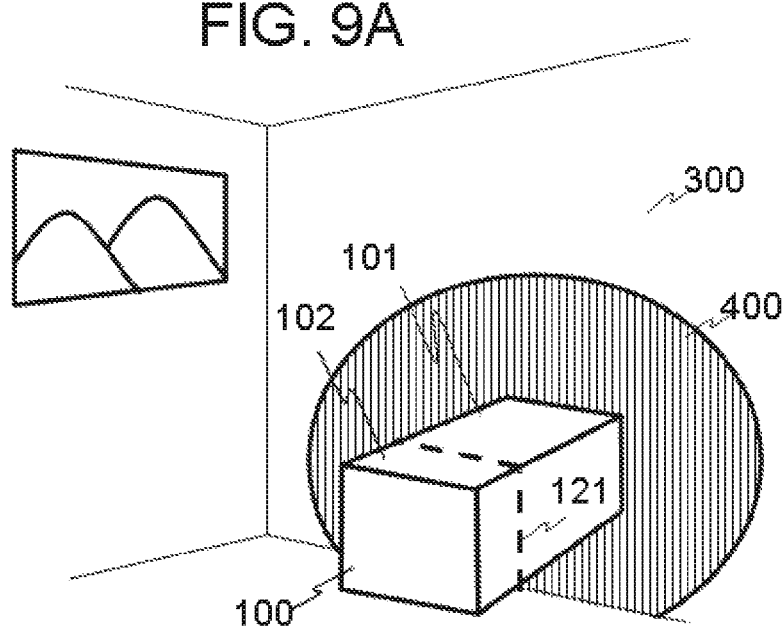
FIG. 9A and FIG. 9B explain a first modification of the virtual object display mode according to the embodiment of the present invention.
Figure 9B:
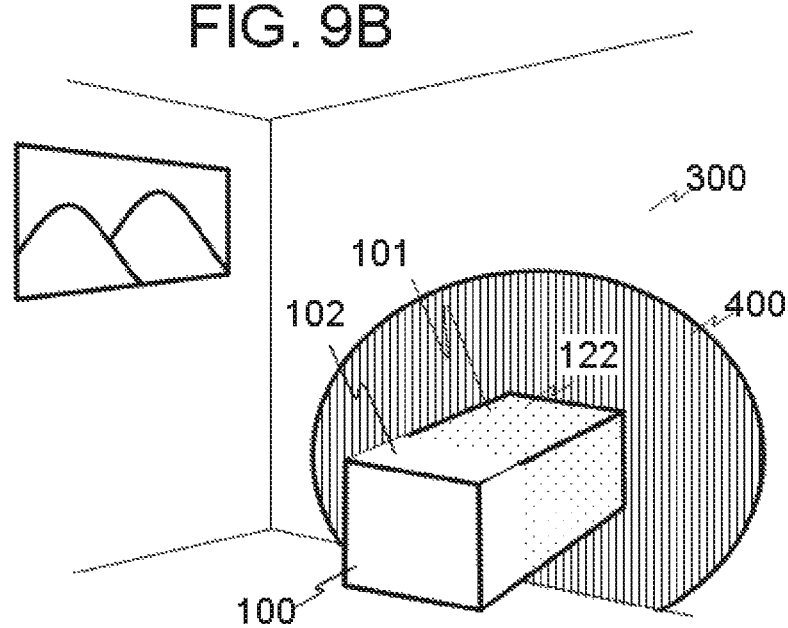

For example, as illustrated in FIG. 9A, the display correction unit 224 corrects the display data so as to display a line 121 between the rear region 101 and the front region 102. Otherwise, as illustrated in FIG. 9B, the display correction unit 224 corrects the display data so as to display the rear region 101 in a surface pattern 122 which differentiates the surface of the rear region 101 from that of the original virtual object 100. The correction mode illustrated in FIG. 9A and that in FIG. 9B may be combined with each other.

Second Modification

Figure 10:
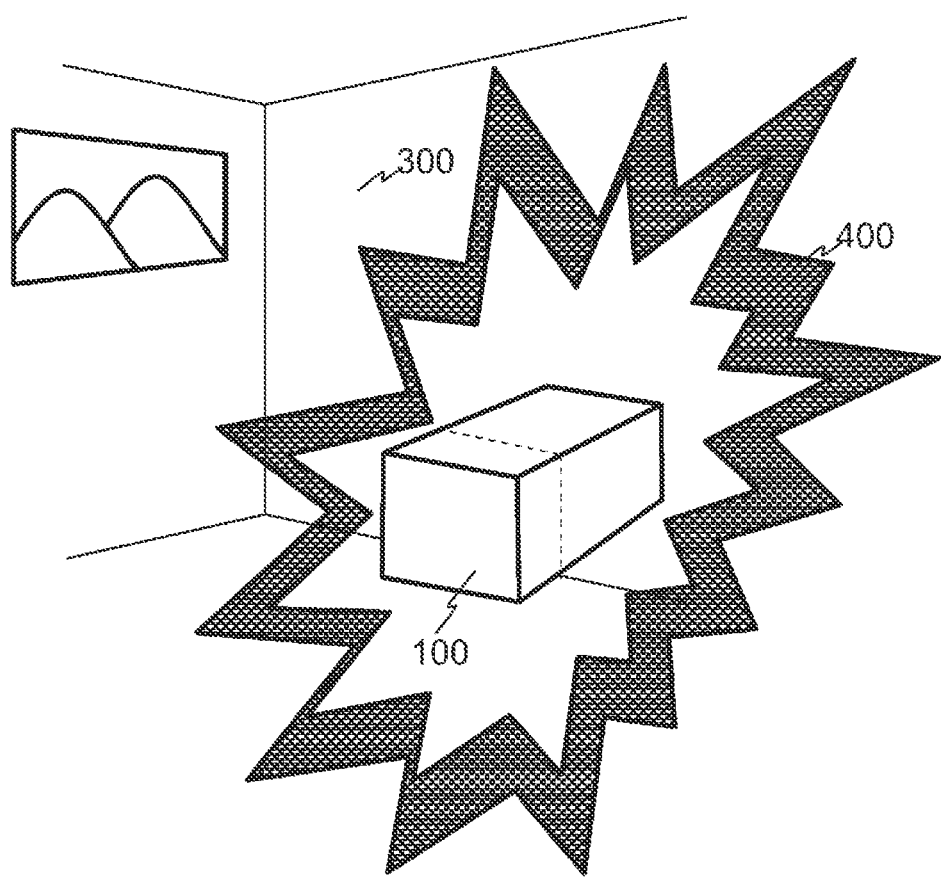
FIG. 10 explains a second modification of the virtual object display mode according to the embodiment of the present invention.

The additional object 400 may be highlighted. FIG. 10 illustrates an example of the highlighted additional object 400. The manner of highlighting for the additional object 400 may be stored in advance in the additional object data 235. Otherwise, the display correction unit 224 may use various image processing software to process and display the stored additional object 400 in the highlight display mode.

Highlighting the additional object 400 enables the user 201 to easily recognize that the display mode of the virtual object 100 is different from the original display mode thereof. That is, in the highlight display mode, the user 201 can grasp more intuitively that the region which is supposed not to be displayed is being displayed.

Third Modification

The additional object data 235 may include textures which vary depending on the materials and/or types of the structural object 300 into which the virtual object 100 sinks. In this case, the display correction unit 224 refers to the space recognition data 233 generated by the space recognition unit 221 to specify the material and/or type of the structural object 300. Then, the display correction unit 224 extracts the additional object data 235 of the texture corresponding to the specified material and/or type, and displays the extracted additional object data 235 as the additional object 400.

Figure 11:
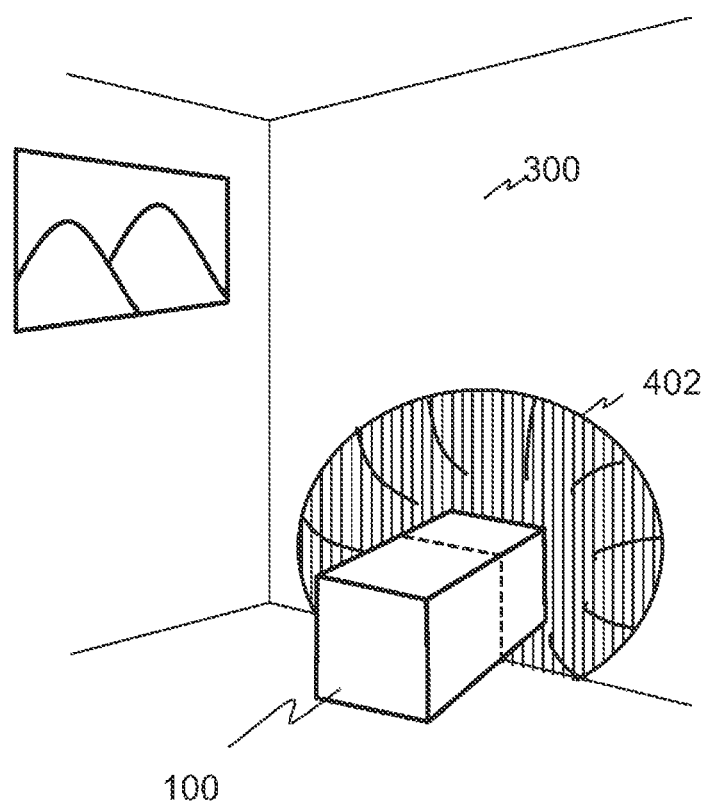
FIG. 11 explains a third modification of the virtual object display mode according to the embodiment of the present invention.

For example, when the structural object 300 is made of a hard material such as a wall, the additional object 400 representing a state in which the wall is broken as illustrated in FIG. 10 is prepared as the additional object data 235. On the other hand, when the structural object 300 is made of a soft material such as a cushion, an additional object 402 representing a state in which the virtual object 100 sinks into the structural object 300 is prepared and displayed as illustrated in FIG. 11.

In this connection, at this time, the highlight display mode may be changed depending on the material and/or type of the structural object 300 or the texture of the additional object 400.

Fourth Modification

Figure 12:
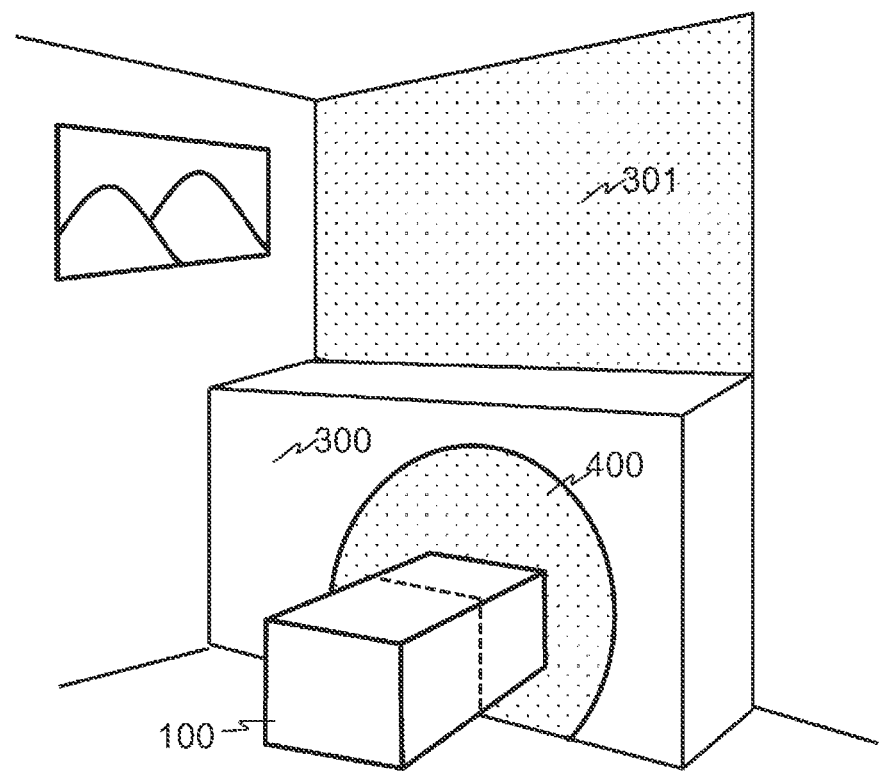
FIG. 12 explains a fourth modification of the virtual object display mode according to the embodiment of the present invention.

The display correction unit 224 may cut out a part of the color image data 231 and use it as the additional object 400. Particularly, as illustrated in FIG. 12, an image of the same texture as that of a structural object 301, which exists further behind the structural object 300 into which the virtual object 100 is pushed, may be used. In this case, the display correction unit 224 uses the space recognition data 233 to process the additional object data 235 in accordance with the placement position of the additional object 400. Then, the display correction unit 224 places the processed additional object data 235.

As described above, when the data of the texture which is the same as that of the background image is used as the additional object 400, the user 201 can more naturally accept the display mode of the virtual object 100 according to the embodiment above.

Fifth Modification

The embodiment described above is configured to clear the display of the virtual object 100 when the virtual object 100 is moved to a position where the whole of the virtual object becomes the rear region 101. Meanwhile, the present invention is not limited thereto. Even when the whole of the virtual object 100 becomes the rear region 101, the virtual object 100 and/or the operation points 110 may be displayed.

Figure 13:
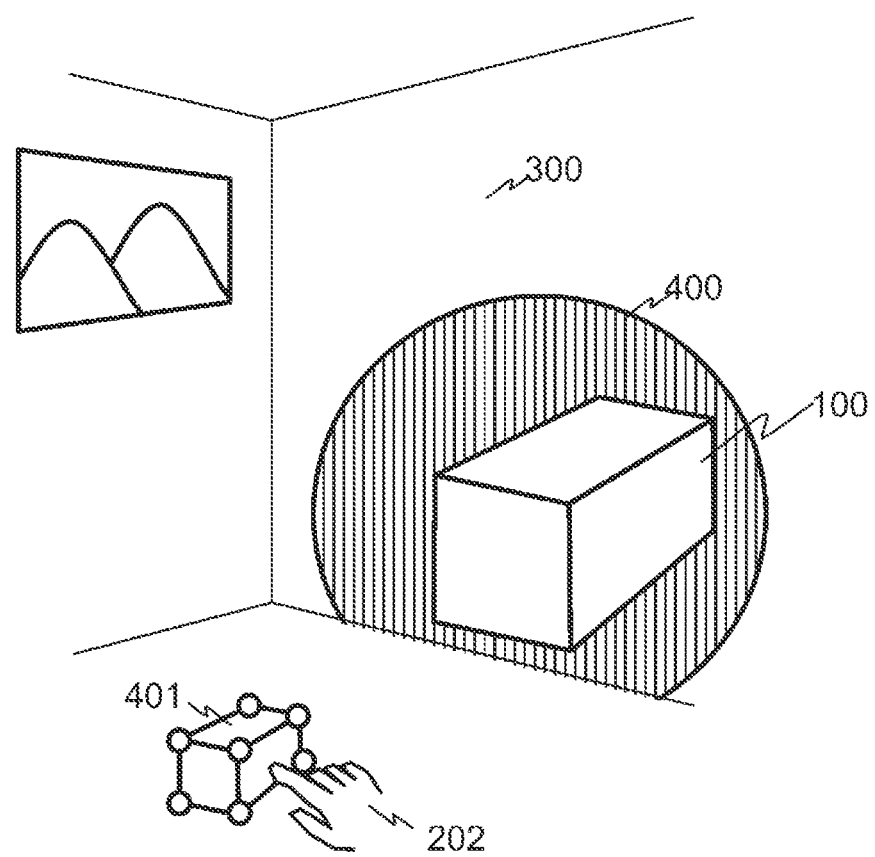
FIG. 13 explains a fifth modification of the virtual object display mode according to the embodiment of the present invention.

For example, as illustrated in FIG. 13, the display correction unit 224 corrects the display data so as to display the virtual object 100 at the calculated position. In addition, the display correction unit 224 may display, as the additional object, a miniature virtual object 401 for assisting a use's operation in front of the virtual object 100. In this case, the display correction unit 224 generates and displays the miniature virtual object 401 based on the virtual object 100.

With this configuration, even when the whole of the virtual object 100 is placed deeper than the structural object 300 in the depth direction, the user 201 can perform an operation while feeling a sense of reality.

Sixth Modification

Figure 14:
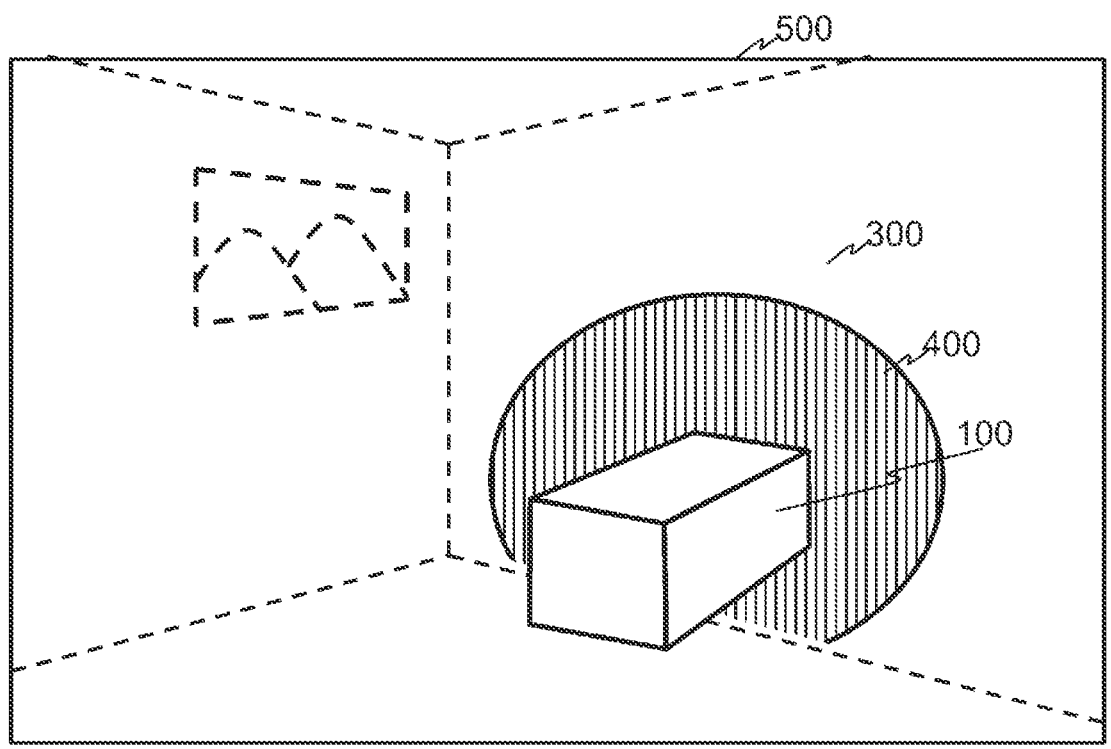
FIG. 14 explains a sixth modification of the virtual object display mode according to the embodiment of the present invention.

The display 215 may be a non-transmission type display. In this case, as illustrated in FIG. 14, the display correction unit 224 superimposes the virtual object 100 and the additional object 400 on the color image (through image 500) acquired by the color image camera 214a.

In the case above, the display terminal is not limited to the HMD 200 including a transmission type display. For example, the display terminal may be a portable information processing device such as an HMD and a portable terminal which include a non-transmission type display.

Seventh Modification

Means for inputting an operation instruction is not limited to a line of sight and gesture, but may include such as a voice and a motion controller.

Eighth Modification

In the embodiment above, the display correction unit 224 is configured to correct the display of the virtual object 100 so as to display all the operation points 110 of the virtual object 100. Meanwhile, the present invention is not limited thereto. The operation points 110 to be displayed may be a part of the operation points 110 of the rear region 101. In other words, at least one of the operation points 110 of the rear region 101 may be displayed.

Similarly, the entire shape of the virtual object 100 is not necessarily displayed. A part of the rear region 101 may be displayed.

The present invention is not limited to the embodiment and the modifications described above, and other various modifications are included therein. For example, the embodiment and the modifications described above have been explained in detail in order to clarify the present invention, but are not necessarily limited to those having all the configurations as described. In addition, a part of the configuration of the present embodiment and the modifications can be replaced with that of other embodiments and other modifications, and the configuration of other embodiments and other modifications can be added to the configuration of the present embodiment. Furthermore, it is possible to add, delete, or replace another configuration with respect to a part of the configuration of the present embodiment and the modifications.

Some or all the configurations described above, functions, processing units, and processing means may be implemented by hardware, for example, by designing them with an integrated circuit. In addition, the configurations and functions described above may be implemented by software by interpreting and executing programs in which the processor implements the respective functions. Information such as programs, tables, and files for implementing various functions can be placed in recording devices such as a memory, a hard disk, and an SSD (Solid State Drive), or recording media such as an IC card, an SD card, and a DVD.

Furthermore, the control lines and the information lines which are considered to be necessary for the purpose of explanation are indicated herein, but not all the control lines and the information lines of actual products are necessarily indicated. It may be considered that almost all the configurations are actually connected to each other.

REFERENCE SIGNS LIST

100: virtual object, 101: rear region, 102: front region, 110: operation points, 121: line, 122: surface mode, 200: HMD, 201: user, 202: finger, 203: arrow, 210: controller, 211: CPU, 212: RAM, 213: ROM, 214: cameras, 214a: color image camera, 214b: distance image camera, 214c: line-of-sight detection device, 215: display, 215a: frame, 216: audio I/F, 217: communication I/F, 218: sensors, 218a: GPS receiver, 218b: gyro sensor, 218c: acceleration sensor, 218d: geomagnetic sensor, 218e: touch sensor, 219: bus, 220: display control unit, 221: space recognition unit, 222: instruction reception unit, 223: display data generation unit, 224: display correction unit, 228: image acquisition unit, 229: audio output control unit, 230: storage device, 231: color image data, 232: distance image data, 233: space recognition data, 234: virtual object data, 235: additional object data, 236: audio data, 237: onomatopoeic word data, 241: frame, 300: structural object, 301: structural object, 400: additional object, 401: miniature virtual object, 402: additional object, 500: through image

The invention claimed is:

1. A display device, comprising:
a display;
a color image camera configured to acquire a color image of a predetermined range;
a distance image camera configured to acquire a distance image of the predetermined range; and
a display control unit configured to display a virtual object and an operation point on the display,
the operation point is a point that accepts an operation instruction for the virtual object, wherein the display control unit is configured to:
generate a three-dimensional map of a structural object existing within the predetermined range using the color image and the distance image,
specify a region of the virtual object behind the structural object as a rear region, based on the three-dimensional map and placement position information for displaying the virtual object at a predetermined placement position within the predetermined range, and
wherein a display control that the display control unit displays the virtual object and the operation point on the display includes a first display control for displaying a first object region which is a region of the virtual object other than the rear region and the operation point which is in the first object region, and a second display control for displaying a second object region which is a region of the virtual object including the rear region, the operation point which is in the second object region and an additional object.

2. The display device according to claim 1, wherein the additional object is an object that shows how the virtual object has penetrated the structural object or how a hole has opened in the structural object around the virtual object.

3. The display device according to claim 1,
wherein the display control unit includes a memory which stores plurality of additional object, and displays the additional object extracted from the memory based on either the material or the type of the structural object or both of them.

4. The display device according to claim 1,
wherein the display control unit configured to display the additional object by using same color image data as that of a second structural object in case where the second structural object, larger than the structural object, exists behind the structural object in the predetermined range.

5. The display device according to claim 1,
wherein the display control unit deforms the additional object in response to change in a display direction of the virtual object and displays the additional object as deformed.

6. A display device, comprising:
a display;
a color image camera configured to acquire a color image of a predetermined range;
a distance image camera configured to acquire a distance image of the predetermined range; and
a controller,
wherein the controller is configured to:
generate a three-dimensional map of a structural object existing within the predetermined range using the color image and the distance image,
specify a region of a virtual object behind the structural object as a rear region, based on the three-dimensional map and placement position information for displaying the virtual object at a predetermined placement position within the predetermined range,
wherein a display control that the controller controls to display the virtual object and an operation point on the display includes a first display control for displaying a first object region which is a region of the virtual object other than the rear region and the operation point which is in the first object region, and a second display control for displaying a second object region which is a region of the virtual object including the rear region, the operation point which is in the second object region and an additional object, and
wherein the operation point is a point that accepts an operation instruction for the virtual object.

7. The display device according to claim 6, further comprising:
an audio output device; and
wherein the controller is configured to cause the audio output device to output a predetermined sound when displaying the additional object.

8. The display device according to claim 7,
wherein the controller is configured to display a string representing the predetermined sound.

* * * * *